(12) United States Patent
Nield et al.

(10) Patent No.: US 11,608,733 B2
(45) Date of Patent: Mar. 21, 2023

(54) SYSTEM AND METHOD FOR MONITORING A DRILL RIG

(71) Applicants: Barry J. Nield, Jacksonville Beach, FL (US); George A. Nield, Jacksonville Beach, FL (US)

(72) Inventors: Barry J. Nield, Jacksonville Beach, FL (US); George A. Nield, Jacksonville Beach, FL (US)

( * ) Notice: Subject to any disclaimer, the term of this patent is extended or adjusted under 35 U.S.C. 154(b) by 730 days.

(21) Appl. No.: 16/173,513

(22) Filed: Oct. 29, 2018

(65) Prior Publication Data

US 2020/0131897 A1 Apr. 30, 2020

(51) Int. Cl.
*E21B 47/00* (2012.01)
*G06T 7/00* (2017.01)
*G01M 13/00* (2019.01)

(52) U.S. Cl.
CPC ............ *E21B 47/00* (2013.01); *G06T 7/0004* (2013.01); *G01M 13/00* (2013.01); *G06T 2207/20092* (2013.01)

(58) Field of Classification Search
None
See application file for complete search history.

(56) References Cited

U.S. PATENT DOCUMENTS

| | | | |
|---|---|---|---|
| 7,792,256 B1 * | 9/2010 | Arledge | H04L 12/2818 379/106.01 |
| 9,845,664 B2 | 12/2017 | Nield | |
| 10,029,648 B2 | 7/2018 | Hwang et al. | |
| 10,068,441 B2 | 9/2018 | Henrie | |
| 2003/0101156 A1 * | 5/2003 | Newman | G06F 16/40 |
| 2017/0124851 A1 * | 5/2017 | Watkins | G08B 17/125 |

* cited by examiner

*Primary Examiner* — Roy Y Yi
*Assistant Examiner* — Geoffrey T Evans
(74) *Attorney, Agent, or Firm* — Steve LeBlanc, LLC

(57) ABSTRACT

A system for communicating with a drill rig includes a data acquisition board and a plurality of sensors. Each sensor transmits operational data associated with the drill rig to the data acquisition board, and the operational data includes an operating parameter of equipment or environmental information associated with the drill rig. A camera generates image data associated with the operational data and transmits the image data to the data acquisition board. A processor on the data acquisition board is configured to synchronize the operational data with the image data. A mobile communications device receives the operational data synchronized with the image data from the processor. A database server is remote from the above ground drill rig and in communication with the mobile communications device, and the database server is configured to receive the operational data synchronized with the image data from the mobile communications device.

17 Claims, 3 Drawing Sheets

SYSTEM AND METHOD FOR MONITORING A DRILL RIG

FIELD OF THE INVENTION

The present invention generally involves a system and method for communicating with a drill rig. In particular embodiments, the system and method may be incorporated into land-based or offshore drill rigs used for gas production and/or well service operation.

BACKGROUND OF THE INVENTION

Drill rigs are commonly used in oil and gas production and well service operations and include heavy duty machinery to bore substantial distances below the earth's surface. The drill rigs are often located in remote locations, and the heavy duty machinery is expensive to maintain and can cause significant personnel and equipment damage in a short period of time. In addition, changes in environmental conditions and/or the location of the drill rig may adversely affect operations and maintenance of the heavy duty machinery. As a result, local personnel are often required to monitor the operations, identify operating trends and/or imminent events, and take appropriate actions to prevent or mitigate personnel and/or equipment damage.

Various systems and methods exist for remotely monitoring of drill rig operations. For example, U.S. Pat. No. 9,845,663, issued to the same inventor as the present application, discloses and teaches an apparatus and method for communicating with a drill rig to remotely monitor operations on the drill rig. Although the systems and methods taught by U.S. Pat. No. 9,845,663 enhance analysis of operating parameters, improve trend analysis, facilitate maintenance scheduling, and/or anticipate imminent equipment failures or unsafe operating practices, the remote monitoring taught by U.S. Pat. No. 9,845,663 does not associate sensor information with visual/image information to remotely confirm or verify operations on the drill rig. Therefore, the need exists for an improved system and method for communicating with a drill rig that can visually corroborate sensor information with visual/image information from the drill rig.

BRIEF DESCRIPTION OF THE INVENTION

Aspects and advantages of the invention are set forth below in the following description, or may be obvious from the description, or may be learned through practice of the invention.

One embodiment of the present invention is a system for communicating with an above ground drill rig that includes a data acquisition board and a plurality of sensors on the above ground drill rig. Each sensor transmits operational data associated with the above ground drill rig to the data acquisition board. The operational data includes at least one of an operating parameter of equipment on the above ground drill rig or environmental information associated with the above ground drill rig. A camera on the above ground drill rig generates image data associated with the operational data and transmits the image data to the data acquisition board. A processor on the data acquisition board is configured to execute first logic stored in a first memory that causes the processor to synchronize the operational data with the image data. A mobile communications device receives the operational data synchronized with the image data from the processor, and the mobile communications device is a smart phone or a tablet. A database server is remote from the above ground drill rig and in communication with the mobile communications device, and the database server is configured to receive the operational data synchronized with the image data from the mobile communications device.

Another embodiment of the present invention is a system for communicating with an above ground drill rig that includes a data acquisition board and a plurality of sensors on the above ground drill rig. Each sensor transmits operational data associated with the above ground drill rig to the data acquisition board, and the operational data includes at least one of an operating parameter of equipment on the above ground drill rig or environmental information associated with the above ground drill rig. A camera on the above ground drill rig generates image data associated with the operational data and transmits the image data to the data acquisition board. A processor on the data acquisition board is configured to execute first logic stored in a first memory that causes the processor to synchronize the operational data with the image data. A database server is remote from the above ground drill rig and in communication with the processor, and the database server is configured to receive the operational data synchronized with the image data from the processor and execute second logic stored in a second memory that causes the database server to compare the operational data synchronized with the image data.

In yet another embodiment of the present invention, a method for communicating with an above ground drill rig includes sensing an operating parameter of equipment on the above ground drill rig and generating an image associated with the operating parameter of equipment on the above ground drill rig. The method further includes transmitting operational data reflective of the operating parameter and image data reflective of the image to a data acquisition board on the above ground drill rig. The method also includes synchronizing the operational data with the image data, transferring the operational data synchronized with the image data to a mobile communications device, and transferring the operational data synchronized with the image data from the mobile communications device to a database server remote from the above ground drill rig.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
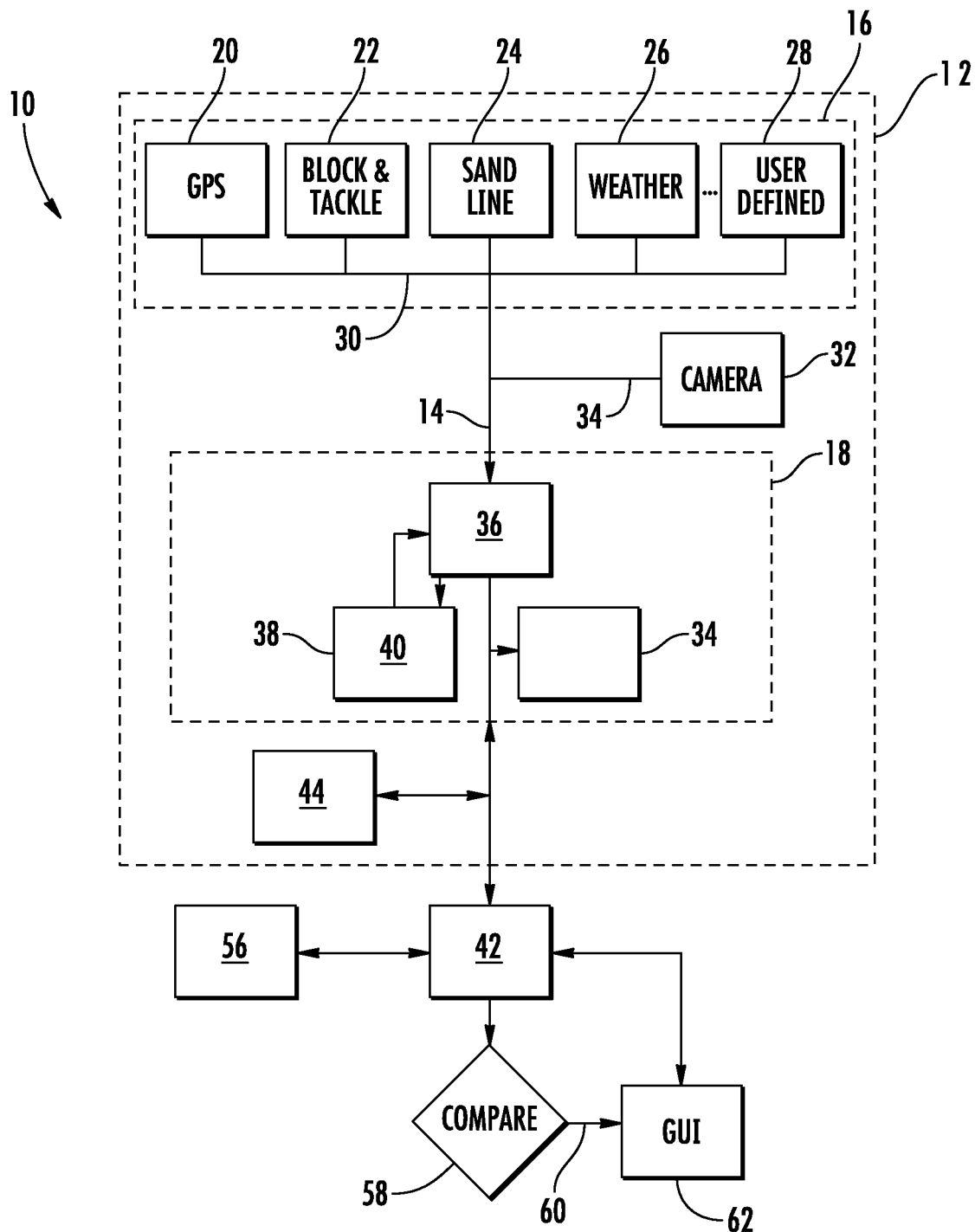
FIG. 1 is a block diagram of an exemplary system and method for communicating with a drill rig according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit hereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used in the claims, the definite article "said" identifies required elements that define the scope of embodiments of the claimed invention, whereas the definite article "the" merely identifies environmental elements that provide context for embodiments of the claimed invention that are not intended to be a limitation of any claim.

Various embodiments of the present invention provide a system and method for communicating with a drill rig. The system generally includes one or more sensors that monitor conditions associated with the drill rig and generate operational data reflective of the conditions. The operational data may include, for example, temperature, pressure, speed, depth, weight, volume, or other operating parameters for various equipment on the drill rig. Alternately or in addition, the operational data may include environmental information associated with the drill rig, such as weather conditions, weather forecasts, location of the drill rig, and attitude (e.g., pitch and yaw) of the drill rig. The system also includes one or more cameras that generate image data associated with the operational data. The image data may include, for example, pictures or video of the equipment, operator stations, or storage locations on the drill rig.

The sensors and camera transmit the operational data and image data, respectively, to a data acquisition board on the drill rig. A processor on the data acquisition board synchronizes the operational data with the image data so that the image data accurately reflects pictures or video of the equipment, operator stations, or storage locations associated with the operational data. Periodically or continuously the data acquisition board may transmit the operational data synchronized with the image data to a mobile communications device, such as a smart phone or a tablet, and the mobile communications device in turn may transmit the data to a database server remote from the drill rig. Alternately or in addition, the data acquisition board may periodically or continuously transmit the operational data synchronized with the image data directly to the database server remote from the drill rig.

The database server allows a user remote from the drill rig to access the data to determine if the operational data is consistent or inconsistent with the image data. For example, the user may compare the operational data for an operating piece of equipment to image data showing the operator station for the equipment to verify that the operator station is appropriately staffed and/or that the operators are following established procedures. The user may also use the operational data synchronized with the image data to provide training to new operators remotely from the drill rig. Alternately or in addition, the database server may compare the operational data synchronized with the image data and generate a notification if the operational data is consistent or inconsistent with the image data. For example, the database server may send a notification when the operational data indicates that a particular piece of equipment is being operated and the image data indicates that the operator station is properly staffed or not properly staffed. The user may later review the notifications to conduct further analysis or inquiry for those notifications indicating that the operational data is inconsistent with the image data. In this manner, the systems and methods described herein enable a user to remotely communicate with the drill rig to receive real time or near real time data from the drill rig that allows the user to confirm or verify operating conditions on the drill rig.

The present disclosure refers to sensors, processors, database servers, logic, memory, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly. For example, if a first device accesses a file or data from a second device, the access may involve one or more intermediary devices, proxies, and the like. The actual file or data may move between the components, or one device may provide a pointer or metafile that the other device uses to access the actual data from a still further device.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may also be adapted to provide additional functionality complementary or unrelated to the present subject matter. For instance, one or more computing devices may be adapted to provide desired functionality by accessing logic or software instructions rendered in a computer-readable form. When software is used, any suitable programming, scripting, or other type of language or combinations of languages may be used to implement the teachings contained herein. However, software need not be used exclusively or at all. For example, some embodiments of the systems and methods set forth herein may also be implemented by hard-wired logic or other circuitry, including, but not limited to application-specific circuits. Of course, combinations of computer-executed software and hard-wired logic or other circuitry may also be suitable.

Embodiments of the systems and methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Alternately or in addition, the computing device(s) may comprise circuitry that renders the device(s) operative to implement one or more of the methods of the present subject matter. Furthermore, components of the presently-disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

Referring now to the drawings, wherein identical numerals indicate the same elements throughout the figures, FIG. 1 provides a block diagram of an exemplary system and method 10 for communicating with a drill rig 12 according to one embodiment of the present invention. As shown in FIG. 1, the system and method 10 may include a communication link 14 that operably connects one or more sensors 16 to a data acquisition board 18 on the drill rig 12. The communications link 14 may include one or more wired, wireless, or other suitable communication links known to one of ordinary skill in the art for transferring data between components.

The sensors 16 monitor parameters associated with the drill rig 12, equipment on the drill rig 12, and/or the environment of and around the drill rig 12. Examples of suitable sensors 16 within the scope of the present invention include a GPS sensor 20, a block and tackle sensor 22, a sand line sensor 24, a weather sensor 26, and even a user-defined sensor 28. The user defined sensor 28 enables a customer to identify another sensor to transmit data to the data acquisition board 18. Each sensor 16 may transmit a specific type of operational data 30 associated with the drill rig 12 through the communications link 14. The operational data 30 may thus include information related to rig safety, equipment maintenance requirements, rig operating parameters, and other data of interest to rig management personnel.

As shown in FIG. 1, the system and method 10 further includes a camera 32 on the drill rig 12 that generates image data 34 and transmits the image data through the communications link 14 to the data acquisition board 18. The image data 34 may be associated with the operational data 30 to allow the user to visually verify or confirm information conveyed by the operational data 30. For example, the weather sensor 26 may transmit operational data 30 reflective of lightning or changing weather near the drill rig 12, and the camera 32 may generate image data 34 that includes photographs or video of the weather in the vicinity of the drill rig 12.

The data acquisition board 18 may be contained within a protective housing on the drill rig 12 to insulate the data acquisition board 18 from the environment. The degree and type of protection the housing provides is dictated by the environment in which the data acquisition board 18 is used (e.g., weather proof, hermetically sealed, etc.). The data acquisition board 18 generally includes a processor 36 and memory 38 for receiving the operational data 30 and image data 34 from the sensors 16 and camera 32, respectively. The processor 36 is configured to execute logic 40 stored in the memory 38 that causes the processor 36 to perform various functions on the operational data 30 and image data 34. For example, execution of the logic 40 may cause the processor 36 to concatenate the operational data 30 from each sensor 16 and synchronize the operational data 30 with the image data 34. In this manner, the data acquisition board 18 chronologically matches the operational data 30 with photographs and video included in the image data 34 for later transfer to a database server 42 remote from the drill rig 12.

Figure 2:
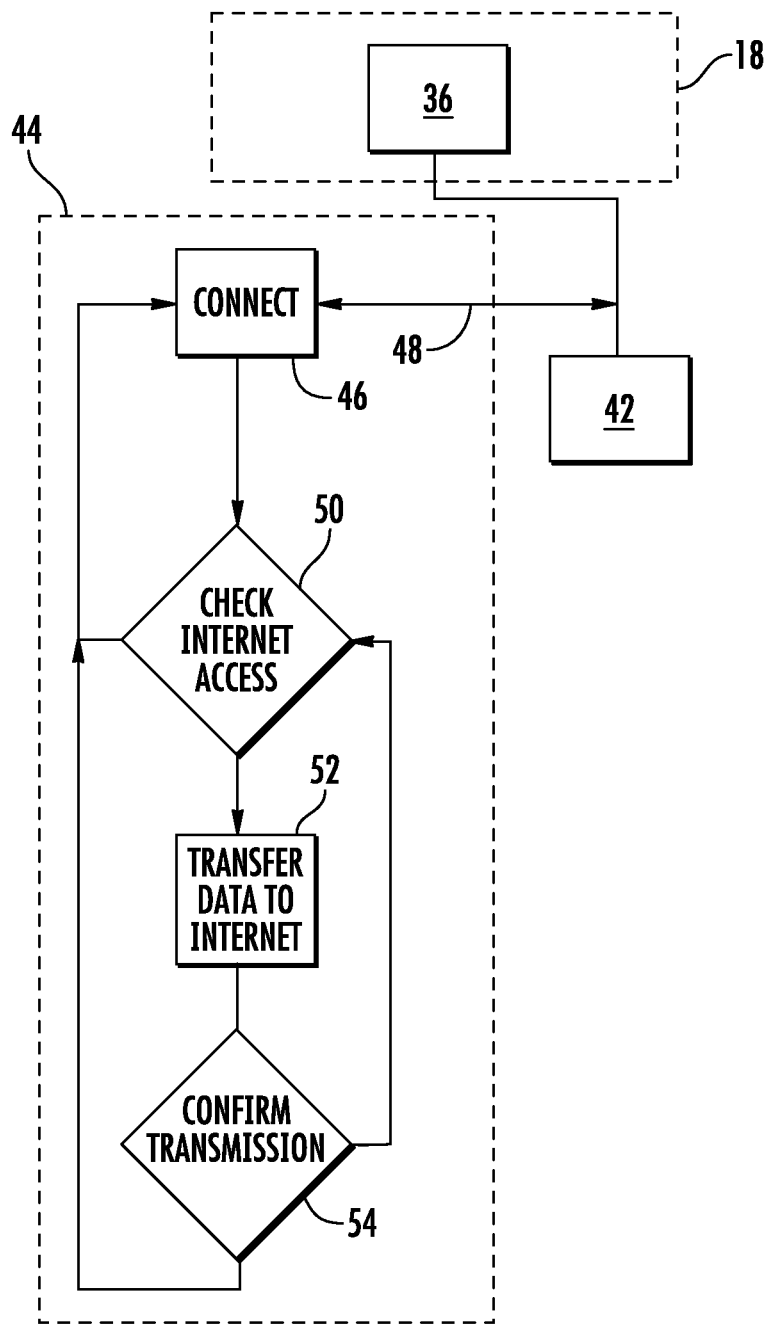
FIG. 2 is a block diagram of a communications protocol within the scope of various embodiments of the present invention.

Alternately or in addition, execution of the logic 40 may enable the processor 36 to perform or participate in a communications protocol that enables the processor 36 to transfer the operational data 30 and image data 34 to a mobile communications device 44 such as a smart phone or tablet on the drill rig 12 for subsequent transfer to the database server 42 when communications are available. FIG. 2 provides a block diagram of an exemplary communications protocol within the scope of various embodiments of the present invention that may be incorporated into an application installed in the mobile communications device 44. At block 46, the mobile communications device 44 interfaces or connects to the processor 36 through a wired or wireless connection 48. This interface or connection may be at scheduled times or at predetermined intervals. For example, the mobile communications device 44 may initiate a Bluetooth® wireless connection to the data acquisition board 18 at 6 a.m., 12 p.m., 6 p.m., etc. or every 10 minutes since the last successful connection. Once communication with the data acquisition board 18 is established, the mobile communications device 44 and/or the processor 36 may identify the most recent transfer of operational data 30 synchronized with image data 34 to the database server 42 directly or from the mobile communications device 44, and the processor 36 may then transfer all additional operational data 30 synchronized with image data 34 received from the sensors 16 and camera 32 since that time.

At block 50, the communications device 44 may continuously or periodically check for internet access, and when internet access becomes available, the communications device 44 may transfer all of the operational data 30 synchronized with the image data 34 through the internet to the database server 42, indicated by block 52. At block 54, the communications device 44 may wait for confirmation that the data transfer was completed. If the confirmation is received, the communications device 44 returns to block 46 to wait for the next scheduled communication with the data acquisition board 18. Otherwise, the communications device 44 returns to block 50 to check for internet access again.

Returning to FIG. 1, the database server 42 is configured to receive the operational data 30 synchronized with the image data 34 directly from the data acquisition board 18 or indirectly from the communications device 44. The database server 42 may be, for example, a Redhat Linux server executing logic 56 to receive data from multiple sources simultaneously, reconcile the data to eliminate duplicate data, and/or convert the data, as desired, to ASCII or another high level language for incorporation into a database. At block 58, the logic 56 may also cause the database server 42 to compare the operational data 30 to the synchronized image data 34 and generate a notification 60 based on the comparison. For example, if the operational data 30 indicates that equipment is operating and the image data 34 indicates that the operating station for the equipment is properly staffed, then the notification 60 will reflect that the operational data 30 is consistent with the image data 34. Conversely, if the operational data 30 indicates that equipment is operating and the image data 34 indicates that the operating station for the equipment is unmanned, then the notification 60 will reflect that the operational data is inconsistent with the image data 34.

As further shown in FIG. 1, the notification 62 may be transmitted to a graphical user interface (GUI) 62 selected by the user. The GUI 62 may be, for example, a smart phone, tablet, computer, or other communications device selected by the user for receiving the notification 60 from the database server 42. In this manner, the user may select the method (e.g., e-mail, text, automated phone call, dashboard alert, etc.) by which the user may receive the notification 60 from the database server 42. Alternately or in addition, the GUI 62 may enable the user to directly access operational data 30, image data 34, and/or notifications 60 stored in the database server 42 for each drill rig 12 in the user's account.

Figure 3:
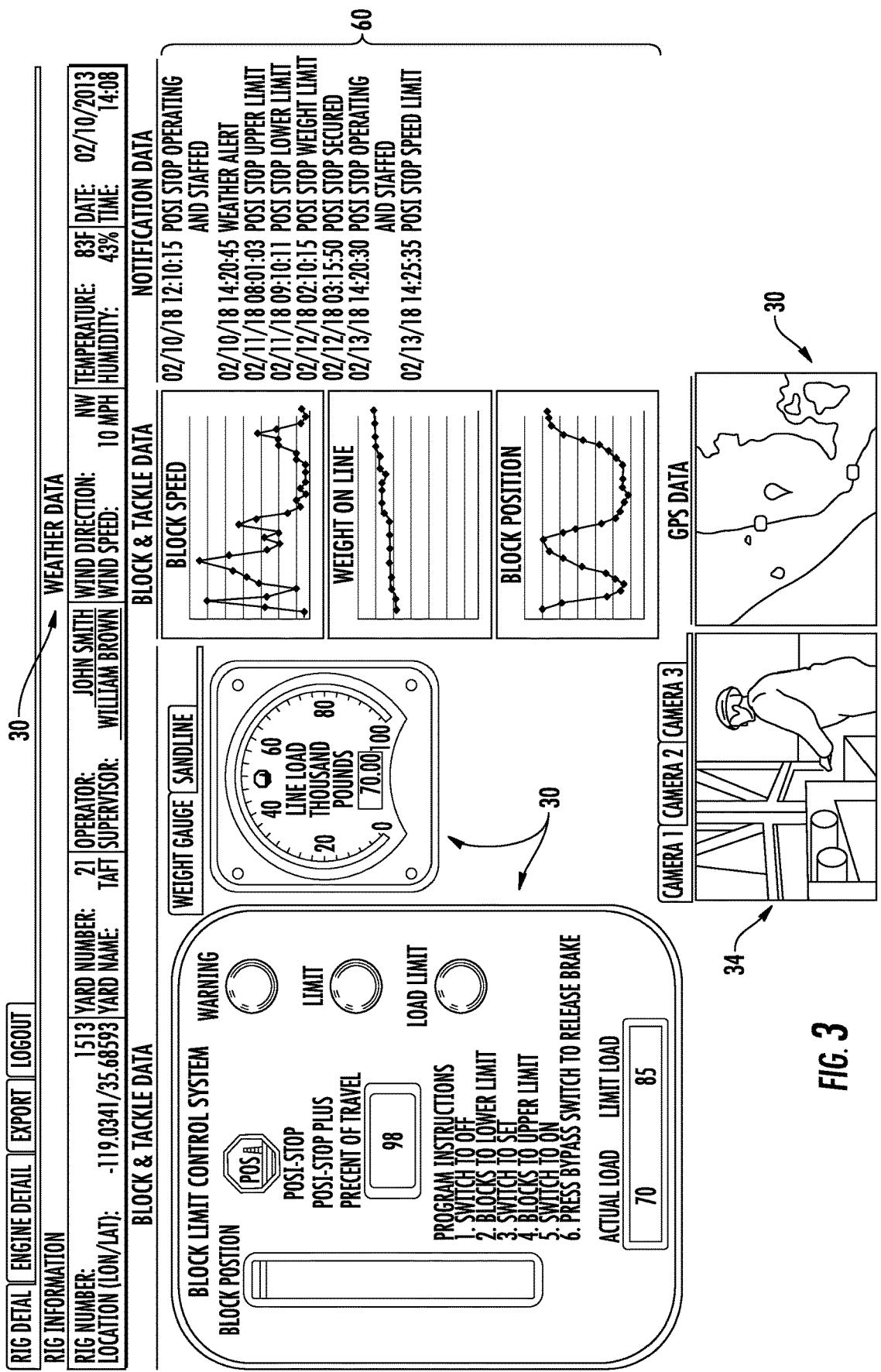
FIG. 3 is an exemplary screen shot showing data available to a user.

FIG. 3 provides an exemplary screen shot of the GUI 62 showing the operational data 30 and image data 34 available to the user. The GUI 62 may display "RIG INFORMATION" to identify the particular drill rig 12 along with various combinations of real time and/or historical operational data 30 from the sensors 16 and image data 34 from the cameras 32. As shown in FIG. 3, for example, the GUI 62 may display real time or historical WEATHER DATA from the weather sensor 26, BLOCK AND TACKLE DATA from the block and tackle sensor 22, and GPS DATA from the GPS sensor 20. The GUI 62 may further display the most recent notifications 60 generated by the database server 42. When an individual notification 60 is selected, the GUI 62 may display the operational data 30 synchronized with the image data 34 for the time of the notification. In this manner, the user may review the operational data 30 and image data 34 from previous notifications 60 to confirm proper operations, identify deficiencies in operations, or provide training for additional operators.

As previously discussed with respect to FIG. 1, the logic 40 in the data acquisition board 18 may enable the user to create one or more user-defined sensors 28 to monitor particular equipment and/or conditions on the drill rig 12. In addition, the logic 40 in the data acquisition board 18 and/or the logic 56 executed by the database server 42 may enable the user to enable (i.e., turn on) a particular sensor 16 and/or adjust the baseline parameter or operating limit used to generate the notification 60. Similarly, the user may associate a particular camera 32 with particular equipment on the drill rig 12 so that image data 34 from the camera 32 becomes associated with operational data 30 for the equipment.

The system and method 10 described and illustrated with respect to FIGS. 1-3 enhances the user's ability to efficiently receive and analyze operational data 30 and compare the operational data 30 to the synchronized image data 34. The comparison between the operational data 30 and the image data 34 allows the user to verify proper operations, identify improper operations, and provide remote training for prospective operators of the drill rig 12.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system for communicating with an above ground drill rig, comprising:
   a data acquisition board on the above ground drill rig;
   a plurality of sensors on the above ground drill rig, wherein each sensor transmits operational data associated with the above ground drill rig to said data acquisition board, wherein said operational data comprises at least one of an operating parameter of equipment on the above ground drill rig or environmental information associated with the above ground drill rig;
   a camera on the above ground drill rig that generates image data associated with said operational data and transmits said image data to said data acquisition board;
   a processor on said data acquisition board configured to execute first logic stored in a first memory that causes said processor to synchronize said operational data with said image data;
   a mobile communications device that receives said operational data synchronized with said image data from said processor, wherein said mobile communications device comprises a smart phone or a tablet; and
   a database server remote from the above ground drill rig and in communication with said mobile communications device, wherein said database server is configured to receive said operational data synchronized with said image data from said mobile communications device.

2. The system of claim 1, wherein said database server is configured to execute second logic stored in a second memory that causes said database server to compare said operational data synchronized with said image data.

3. The system of claim 2, wherein said database server is configured to generate a notification when said operational data synchronized with said image data is inconsistent with said image data.

4. The system of claim 2, wherein said database server is configured to generate a notification when said operational data synchronized with said image data is consistent with said image data.

5. The system of claim 2, wherein at least one of said first logic or said second logic enables a user to select said operational data to be synchronized with said image data.

6. The system of claim 2, wherein at least one of said first logic or said second logic enables a user to select said operational data to be compared with said image data.

7. A system for communicating with an above ground drill rig, comprising:
   a data acquisition board on the above ground drill rig;
   a plurality of sensors on the above ground drill rig, wherein each sensor transmits operational data associated with the above ground drill rig to said data acquisition board, wherein said operational data comprises at least one of an operating parameter of equipment on the above ground drill rig or environmental information associated with the above ground drill rig;
   a camera on the above ground drill rig that generates image data associated with said operational data and transmits said image data to said data acquisition board;
   a processor on said data acquisition board configured to execute first logic stored in a first memory that causes said processor to synchronize said operational data with said image data;
   a database server remote from the above ground drill rig and in communication with said processor, wherein said database server is configured to receive said operational data synchronized with said image data from said processor and execute second logic stored in a second memory that causes said database server to compare said operational data synchronized with said image data.

8. The system of claim 7, wherein said database server is configured to generate a notification when said operational data synchronized with said image data is inconsistent with said image data.

9. The system of claim 7, wherein said database server is configured to generate a notification when said operational data synchronized with said image data is consistent with said image data.

10. The system of claim 7, wherein at least one of said first logic or said second logic enables a user to select said operational data to be synchronized with said image data.

11. The system of claim 7, wherein at least one of said first logic or said second logic enables a user to select said operational data to be compared with said image data.

12. A method for communicating with an above ground drill rig, comprising:
- sensing an operating parameter of equipment on the above ground drill rig;
- generating an image associated with said operating parameter of equipment on the above ground drill rig;
- transmitting operational data reflective of said operating parameter and image data reflective of said image to a data acquisition board on the above ground drill rig;
- synchronizing said operational data with said image data;
- transferring said operational data synchronized with said image data to a mobile communications device, wherein said mobile communications device comprises a smart phone or a tablet, and
- transferring said operational data synchronized with said image data from said mobile communications device to a database server remote from the above ground drill rig.

13. The method as in claim 12, further comprising comparing said operational data synchronized with said image data.

14. The method as in claim 13, further comprising generating a notification when said operational data synchronized with said image data is inconsistent with said image data.

15. The method as in claim 13, further comprising generating a notification when said operational data synchronized with said image data is consistent with said image data.

16. The method as in claim 13, further comprising selecting said operational data to be synchronized with said image data.

17. The method as in claim 13, further comprising selecting said operational data to be compared with said image data.

* * * * *